(12) United States Patent
Fukuura et al.

(10) Patent No.: US 6,207,255 B1
(45) Date of Patent: *Mar. 27, 2001

(54) ADSORBENT ARTICLE WITH DUST COLLECTION FUNCTION

(75) Inventors: Masaki Fukuura, Wake-Gun; Teruhiro Okada, Bizen; Shohichi Takamoto, Sohja; Shushi Nishimura, Okayama, all of (JP)

(73) Assignee: Kuraray Chemical Co., Ltd., Bizen (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,020

(22) Filed: Apr. 11, 1997

(30) Foreign Application Priority Data

Apr. 21, 1996 (JP) .................................................. 8-115551

(51) Int. Cl.⁷ ........................................................ B32B 3/26
(52) U.S. Cl. .............................. 428/175; 442/44; 442/59; 442/187; 442/164; 442/149; 442/76; 442/203; 442/205; 442/208
(58) Field of Search .............................. 442/44–59, 187, 442/164, 149, 76, 203, 205, 218; 428/175

(56) References Cited

U.S. PATENT DOCUMENTS 4,296,166 * 10/1981 Ogino ..................................... 428/408
4,904,288 * 2/1990 D'augereau ............................ 55/485

\* cited by examiner

*Primary Examiner*—Elizabeth M. Cole
(74) *Attorney, Agent, or Firm*—Oblon, Spivak, McClelland, Maier & Neustadt, P.C.

(57) ABSTRACT

Preferably configured in ridge and recess irregularity, the inventive article provides adsorption of malodor components in air and also dust collecting function. It comprises woven sheet having coarse three dimensional structure whose areas of sheet surface as well as internal fiber structure allowable to contact to incoming outer air are formed with a binder layer made of latex or emulsion or non-solvent adhesive and such binder layer is adhered with activated carbon particles partially exposed. The process of adhereing activated carbon particles is conveniently performed by a fluidizing bed. The inventive sheet form fabric incorporates the particles with a high void ratio and uniformity and thereby exhibits high adsorptive rate and capacity, and exceedingly low pressure loss with such result that it is applicable regardless of high or air wind rate. Preferable use is a filter element of air-conditioner for cars.

18 Claims, 5 Drawing Sheets

ADSORBENT ARTICLE WITH DUST COLLECTION FUNCTION

FIELD OF THE INVENTION

This invention relates to an adsorbent article or adsorptive product for mainly eliminating a slight amount of malodorous components contained in air or other gases with the advantage of high adsorption rate as well as convenient handling. Particularly this invention relates to a sheet form adsorbent woven fabric with air cleaning and dust collecting function. Main application thereof is a filter element of an air-conditioner or air-cleaner for household or car use, wherein featured are low pressure loss, long use life, and high cleaning performance by one passage with high air velocity.

DESCRIPTION OF THE RELATED ART

Heretofore activated carbon has been widely used as adsorbent for effecting a slight amount of undesirable components in air or other gases, wherein powder or particle form activated carbon is not always convenient to handle. Then, attempts have been made to carry such activated carbon particles firmly onto a porous base material, such as foamed plastics or non-woven fabric. Such carried articles are convenient for the lack of troublesome dusting from powder particles and have the advantage of lower pressure loss due to better permeability of air through voids inside the porous base material.

However, a conventional adsorbent of this type has disadvantage that surfaces of activated carbon particles are covered with a binder layer applied on the base material. For that cause, adsorptive capability exhibits only a fraction. It is a result from preparative process wherein activated carbon powder particles are pre-mixed with a binder and then applied to the base material, thereby the majority of particle surfaces is unavoidably covered under the binder layer, useless to expected function.

Another attempt has been known of mixing the powder particles with polyurethane prepolymer in the process of producing polyurethane foam, wherein with an adequate amount of the powder particles mixed, foaming capability of the polyurethane is inhibited and likewise the majority of particle surfaces is covered or micropores of activated carbon particles are plugged, thus the result is a large decrease in the adsorptive capability from as expected.

Then, the art of having the activated carbon particles carried by coarse knitted article has been proposed, but in the case of planar or two dimensional structure, a coarse structure of such base material provides a low pressure loss, but does not attain sufficient adsorption, and to the contrary, a fine structure of such base article improves the adsorption. but increases the pressure loss excessively, and results in unapplicable case for uses wherein dust collection is also needed.

SUMMARY OF THE INVENTION

The present invention utilizes a woven sheet with steric or three dimensional structure and activated carbon particles adhered to such woven sheet with particle surfaces partially exposed or uncovered more than before. Thereby an adsorbent article exhibits lower pressure loss and in turn, higher adsorptive performance as dust collecting filter.

The inventors herein noticed that, when much turbulent air (or gas) flow passes through a adsorbent having a lower packing density, the contact efficiency between air and adsorbent is so remarkably promoted that it would realize a structure with low pressure loss and suitability for treating with a high rate air wind. In view of such findings, we have experimented in pursuit of such structures based on sheet material having coarse three dimensional structure wherein adsorbent particles are kept to be like afloat in internal space so as to be suitable to treat with higher air passage rate with a minimum hindrance to permeability. Consequently, we have found it advantageous of adhereing activated carbon particles pointwise by means of a binder to coarse three dimensional woven sheet and thereby it is found that the activated carbon particles are successfully kept at an adequate void ratio in internal structure. Therein, turbulent wind flow is further promoted by providing ridge and recess configuration or wavy section with the woven fabric and thus the present invention is attained.

In summary, the present invention provides an adsorbent article with a dust collecting function, performed by a woven sheet having a coarse three dimensional structure and a ridge and recess configuration, which is prepared by:

dipping a woven sheet into a bath containing a latex, an emulsion or a non-solvent adhesive, thereby infiltrating and impregnating the woven structure with a binder material;

squeezing the binder impregnated sheet through rollers and blowing air therethrough in order to break or remove films of binder between the intertwined internal fibers of the sheet;

passing the binder impregnated, woven sheet laterally through a fluidized bed of activated carbon particles kept in the fluidized state by an upward flow of air slightly over the minimum necessary to maintain the fluidized state, wherein the force of upwardly flowing air forces the carbon particles uniformly into the internal structure of the woven sheet; and then pressing the sheet containing the carbon particles between rollers thereby firmly adhering the particles within the sheet and leaving individual particles partially exposed in the internal fiber structure of the sheet.

The present invention also provides an adsorbent article wherein the surface of the adsorbent article is subsequently re-coated with binder material. Then, the inventive adsorbent partially includes aniline, phosphoric acid, maleic acid, ferric or ferrous salts carried by the carbon particles.

DETAILED DESCRIPTION OF THE INVENTION

Figure 1:
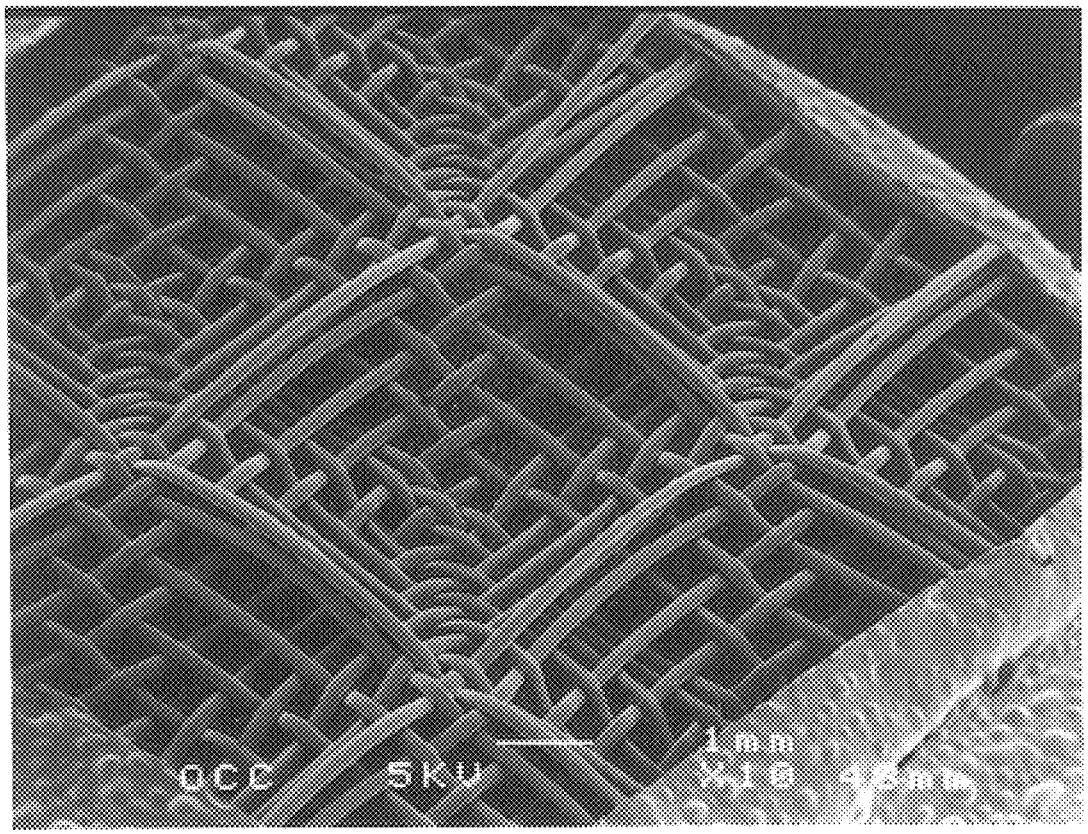
FIG. 1 shows a photograph by scanning electron microscope of a woven fabric of this invention viewed perspectively from askant above.

A base material for the inventive adsorbent is a sheet of a woven fabric having a coarse three-dimensional structure and a ridge and recess configuration, and there is little limit about textile materials and included examples are polyethylene, polypropylene, polyurethane, nylon, polyester, polyvinyl chloride, polyvinylidene chloride, fluororesin, vinylon, polymer of acryl compound, cellulose acetate, promix fiber, and other synthetic or semisynthetic fibers, rayon, cotton, hemp, silk, and other natural fibers, or inorganic fibers, and further various metal fibers such as fabric woven from fine aluminum filament.

The woven fabric in the present invention may be manufactured from 20 to 500 denier fiber made of nylon, polyester, or polypropylene, for instance, through specific weaving art. Therein preferably the warp density is 10 to 50 per inch, and the weft is 10 to 50 per inch.

Then, the phrase: the sheet of a woven fabric having a coarse three-dimensional structure and a ridge and recess configuration means a woven fabric which was finished so by the weaving art or which is configured and structured so after the weaving process, for instance, by pleating (a kind of after-treatment for a woven fabric), wherein ridges may be provided in two different orientations or irregularly.

As noted before, it is preferable to enhance the adsorption so that air stream hits on the sheet surface in the state of turbulent flow, for which effect the ridge and recess configuration is helpful. Also larger voids in the internal structure of the sheet are preferable to treat with larger air wind rate, by which internal structure the turbulence by the ridge and recess configuration at the sheet surface will grow further.

The activated carbon of the inventive adsorbent may be any kind which has large internal surface of several hundreds square meters or more per 1 gram of the sample and exhibits high adsorption. Such activated carbon is usually manufactured from carbonized product of coconut shells and timber, or coal, which are activated by water vapor or carbon dioxide in high temperature, or treatment by zinc chloride, phosphoric acid, concentrated sulfuric acid. Activated carbons prepared by either process are acceptable for this invention.

The activated carbon is a nonpolar material and is known to be unique to exhibit superior adsorption to nearly all gases and liquids.

As for size of the activated carbon particle, there is little limit and broad range of sizes is acceptable or effective, wherein preferable particle range is smaller than 20 mesh and larger than 100 mesh for the purpose to control the pressure loss.

In order to carry the activated carbon particles to internal fibers inside the sheet structured in coarse three dimension, adhesive made of latex or emulsion or non-solvent polymer base is necessary for need to avoid plugging micropores of the activated carbon, wherein in the case of latex or emulsion, a higher solid content such as more than 30%, preferably more than 50%, is recommendable.

Latex or emulsion meanes a dispersion including rubber-based particles or adhesive polymer particles suspending in water medium. The latex includes SBR, chloroprene, nitrile rubber, and other synthetic rubber-based latexes, and The emulsion means copolymer of acrylic acid ester and acrylic acid, or ethylene and vinyl acetate , or polyvinyl acetate suspending in water medium.

Non-solvent polymer based adhesives include adhesive prepolymer with no water or solvent, wherein adhesive made of synthetic rubber is preferable, for instance, Polyurethane prepolymer with excess NCO. More preferable is polyurethane prepolymer with MDI (methylene diisocyanate) base. MDI base prepolymer is more preferable than TDI (tolytene diisocyanate) base prepolymer because MDI base one has tendency to yield less liberated isocyanate and to be less adsorbed by the adsorbent particles.

The present invention involves forming a binder layer made of the binder material or adhesive noted above on the surface of the coarse sheet form fabric as well as surface of fibers constituting the internal structure. In order to carry out this work, the sheet is dipped into a bath containing a binder such as latex or emulsion, followed by squeezing excess picked-up binder through rollers. The adhesive is and squeezed to permeate into the internal structure. Thereafter, air blowing is effective to break or remove films formed between interwinded internal fiber, thus the binder layer is provided on areas of surface of the woven fabric as well as internal structure allowable to contact to in coming outer air.

Adhesion of the activated carbon particles to the binder layer thus formed is carried out by passing a fluidized bed of particles.

Therein, the method of passing a fluidized bed includes passing the sheet kept laterally in a fluidized activated carbon bed and thereby permeate the carbon particles into the sheet. The fluidized bed is prepared in a vessel or tank with the carbon particle filled in a predetermined depth and air is blown into the particle bed from below to fluidize the particles, wherein it is found that, in the case of keeping the gas blow rate at a level relatively close to or slightly over the minimum fluidization rate, the particles conveniently enter into the internal structure of the sheet fabric with uniformity.

In other methods, the particles adhere mostly on surface of the sheet fabric and poorly on fibers in the internal structure. However, the method of passing a fluidized bed allows adjustment of air blow rates and dwelling time according to particles sizes so that the particles may adhere on the internal structure uniformly. Thus, this method is most suitable to the purpose.

Following the adhesion of particles onto the sheet, pressing the sheet thus treated between a paired pinch rolls lightly will effect adhesion of the particles, wherein a part or all of the rolls may be heated to promote the adhesion.

The activated carbon particles carried by the sheet form fabric are exposed on surface of the binder layer formed on fibers of the internal structure. This target is attained in this invention because such particles are delivered in the form of not a mixture with the binder component, that is, after the binder layer has been formed, such particles are delivered and then adhesion is effected by press under heated condition. As a result, the particles are mostly exposed on the surface of the binder layer. This status affords most featuring point in the present invention.

Conventionally in the process of having the activated carbon particles carried by a sheet fabric, mostly the particles have been applied in the state mixed with latex or emulsion and in turn the particles are covered with the binder component to result unavoidably in hindered adsorption. In contrast, the sheet form woven fabric mostly contains the activated carbon particles exposed on the surface, and accordingly features larger adsorptive capacity and higher adsorptive rate. Therein the sheet form woven fabric has coarse or uncompacted structure as a whole to provide a large passage sector for air wind and thus brings about a low pressure drop to high air rate, wherein air passes internally in much turbulent flow.

As for the squeezing step as noted above, clearance between the pinch rolls is set conveniently, wherein preferable is 50 to 80% of the sheet thickness, and in the process of adhereing the carbon particles to polyurethane prepolymer layer, treatment with heated steam is recommended for enhancing the adhesion.

In order to protect the carbon particles adhered to the surface of the coarse sheet form fabric from dropping out during the use; latex or emulsion or non-solvent polymer based adhesive is re-coated and re-subjected to air blowing.

The re-coating binder is not always the same as the binder priory applied into the internal structure, but may be different from such one. In essence, the binder for re-coating is selected in view of suitability, since re-coating will somewhat attenuate the adsorption, but the share percentage of particles lying on the sheet surface which are to be affected by the re-coating is so small as a whole that a loss will normally be under the level of performance requirement.

In designing the adsorbent article, the number of sheet ply may be a plurality or in the form of lamination. In the treatment of pleating, molding may be carried out in a state that the adsorbent sheet is overlaid with paper, nonwoven fabric, electret nonwoven fabric, electrically conductive sheet, magnetic sheet, or sheet having oxidizing catalyst. The inventive adsorbent article bases on a sheet form woven fabric structured with coarse three dimension whose surfaces of sheet as well as internal fibers are adhered with activated carbon particles, and features exceeding low pressure drop in the use circumstances regardless of air passage rate being low or high. For such merits, the inventive adsorptive article is suitable for deodoring article with dust collecting function to be equipped with air-conditioner or air-cleaner for cars.

Example 1

A sheet form fabric (3 mm thick) with coarse wavy three dimensional structure, is used as a carrier of activated carbon particles to prepare deodoring article with dust collecting function, for an air-conditioner and the like. This sheet was dipped into a SBR latex and squeezed by rubber rolls to adjust a latex amount picked up per unit square, and subjected to air blowing to remove films yielded in the internal structure of the porous sheet and then a binder layer is provided on surface of the sheet as well as fibers of internal structure. The sheet thus obtained was Passed through a fluidized bed in which crushed activated carbon particles prepared from coconut shell (28 to 70 mesh) were fluidized for such particles to adhere to the binder layer provided on the surface of sheet as well as internal structure.

Therein, the fluidization vessel is rectangular with many holes at the bottom and the activated carbon particles was packed 6–8 cm high, the air blow rate was about 0.4 m/sec by which top face of fluidizing mass was viewed to be mildly active, and the sheet was passed laterally through a middle portion thereof about at 1 m/sec.

Figure 2:
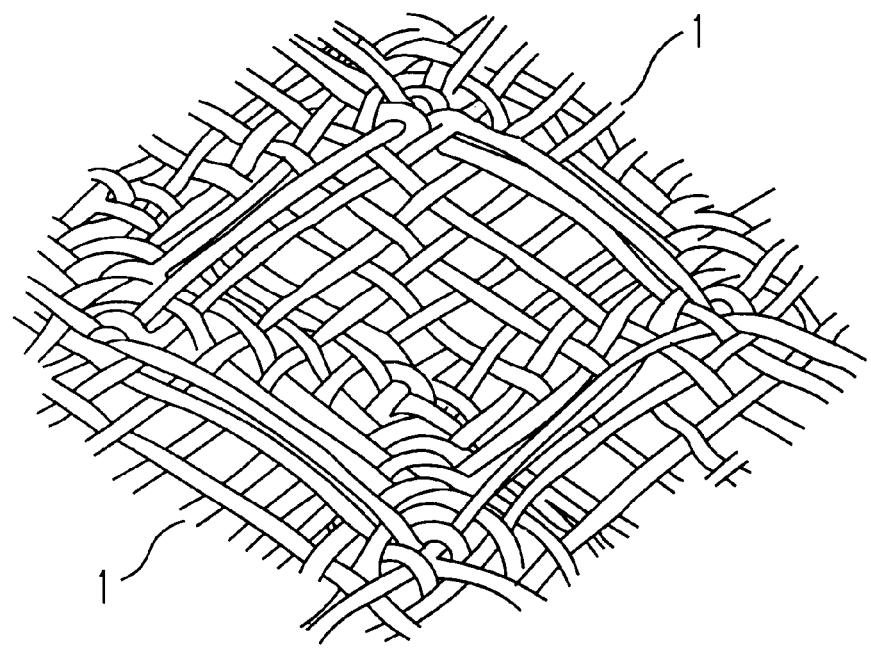
FIG. 2 shows key portions of FIG. 1, to illustrate a pattern of a woven structure.
Figure 4:
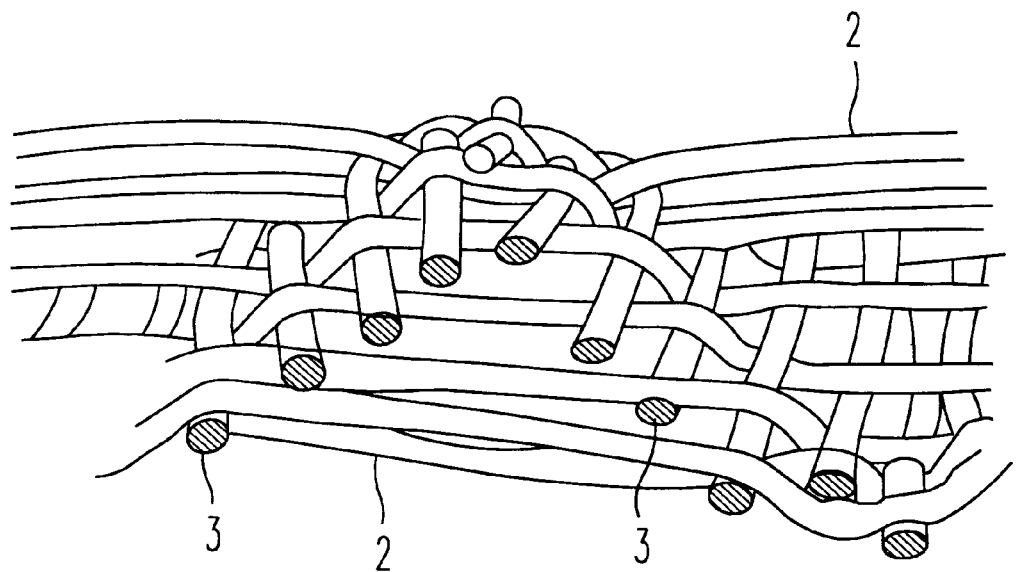
FIG. 4 shows key portions of FIG. 3, to illustrate a pattern of a woven structure.
Figure 3:
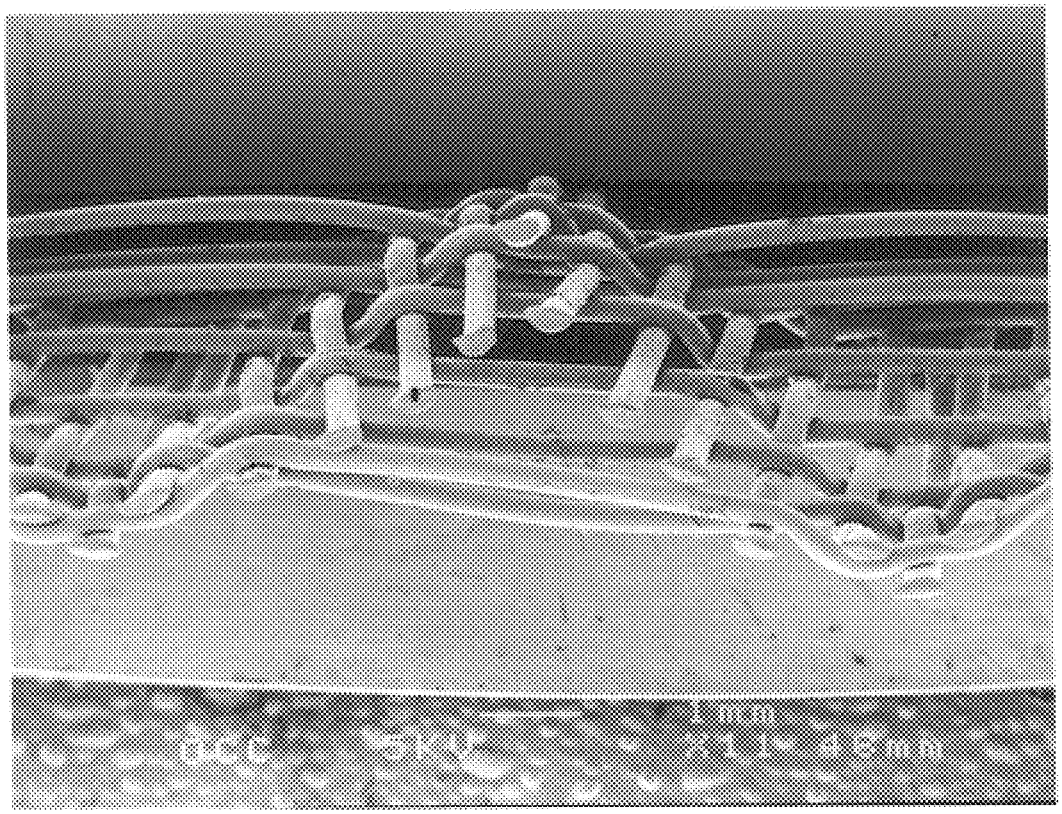
FIG. 3 shows a photograph by scanning electron microscope of a sectional view of the woven fabric.

Then, the fabric incorporated with the particles was passed through the press rollers to suffice adherence with the binder to the particles, and excess particles or weakly adhered particles were shaken off by vibrating the sheet and then dried at 120° C. to finish in a coarse sheet form fabric incorporated with activated carbon particles. Appended FIG. 1 shows a photograph by scanning electron microscope of a woven fabric of this invention viewed perspectively from slantingly above. FIG. 2 shows key portions of FIG. 1, to illustrate a pattern of a woven structure made of fiber 1. FIG. 3 shows a photograph by scanning electron microscope of a sectional view of the woven fabric. And key portions of FIG. 3 is shown in FIG. 4, whereby wavy or "ridge and recess configuration" is realized by intercrossings of the warp 2 and weft 3.

Figure 5:
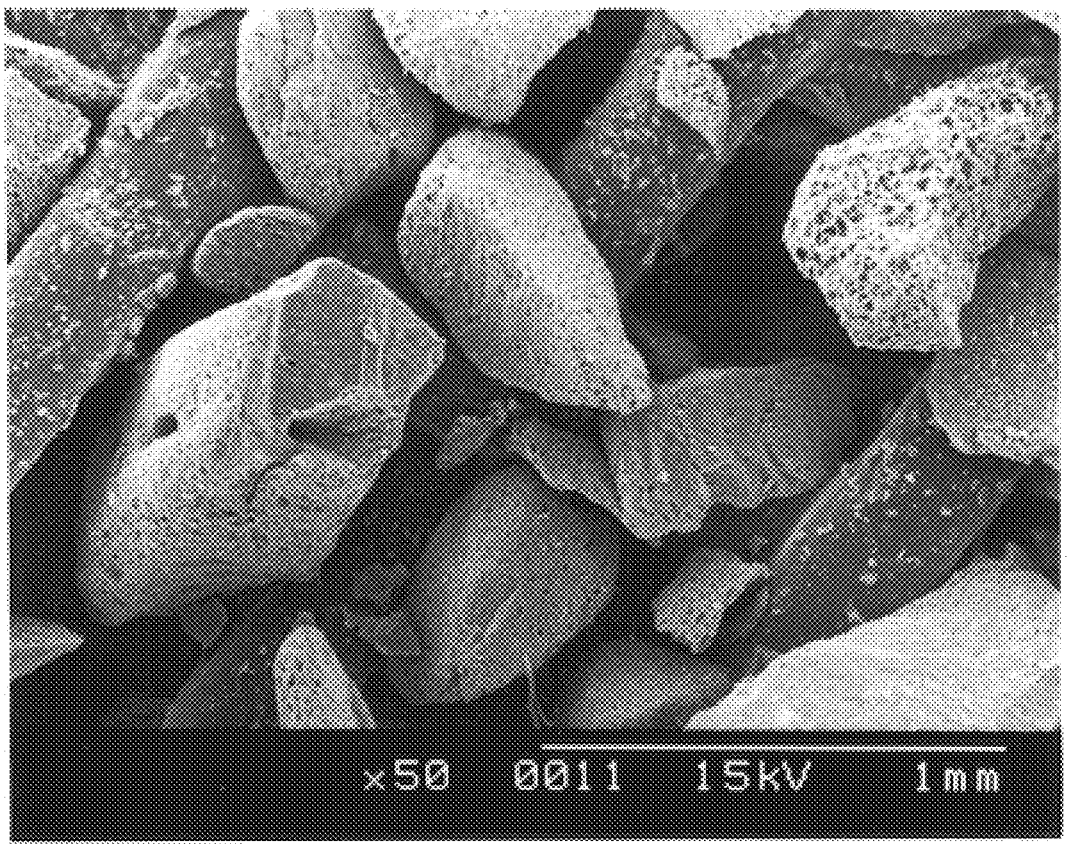
FIG. 5 shows a photograph by scanning electron microscope of activated carbon particles adhered to a fiber through binder layer.
Figure 6:
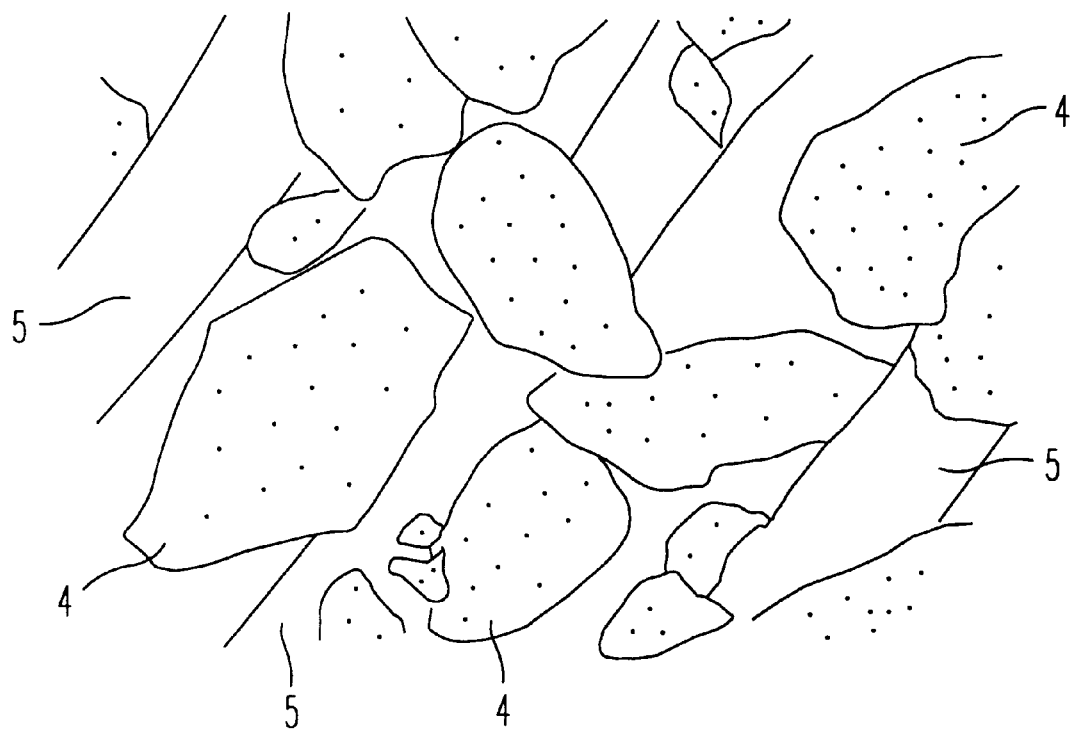
FIG. 6 shows key portions of FIG. 5 to illustrate a internal structure wherein carbon particles adhered to a fiber through binder layer.

FIG. 5 shows a photograph by scanning electron microscope of activated carbon particles adhered to a fiber through binder layer. FIG. 6 shows key portions of FIG. 5, which illustrates the state wherein individual carbon particles 4 are adhered and exposed on the substrate binder layer 5.

The amount of retaining the activated carbon particles obtained in Example 1 was 0.11 g/ml, and adsorptive capacity for benzene (measured by JIS K 1474-1975) was 0.03 g/ml which deserves excellent adsorptivity.

Example 2

A porous sheet form woven fabric (5 mm thick) structured with coarse wavy three dimention, is used as a carrier of activated carbon particles to prepare deodoring article with dust collecting function, for an air-cleaner. This sheet was dipped in SBR latex and squeezed by rubber rolls to adjust a latex amount picked-up per square areas, and then subjected to air blowing to remove films yielded in the internal structure of the porous sheet and thus a binder layer is provided on surfaces of the sheet as well as fibers of internal structure. The sheet obtained was passed through a fluidized bed in which crushed activated carbon particles prepared from coconut shell (70 to 100 mesh) were fluidized for such particles to adhere to the binder layer provided on the surfaces of sheet as well as internal structure, wherein the activated carbon was mixture in the point of carried substance: 60 wt % of the whole was no carrying; the rest 40 wt % was divided into four kinds each 10 wt %; that is, each 10% carrying aniline, phosphoric acid, maleic acid, ferric (or ferrous) salt.

Then, the fabric incorporated with the particles was passed through the press rollers to suffice adherence with the binder to the particles, and excess particles or weakly adhered particles were shaken off by vibrating the sheet, and the fabric was sprayed with a thinned SBR latex by a spray (re-coating of latex), and then dried at 120° C. to finish in a coarse sheet form fabric incorporated with activated carbon particles. The structure thus obtained was similar to FIG. 5.

The amount of retaining the activated carbon particles obtained in Example 2 was 0.07 g/ml, and adsorptive capacity for benzene (measured by JIS k 1474-1975) was 0.02 g/ml.

The fabric (200×200×5 mm) obtained in Example 2 was tested for deodoring purpose. Malodoring components; hydrogen sulfide 250 ppm, or trimethyl amine 50 ppm, and acetoaldehyde 25 ppm, were contained in a box (1×1×1meter) in which the fabric was suspended and air was circulated. In either case the malodor was nearly completely removed in about 30 min.

Example 3

A sheet form fabric incorporated with activated carbon particles, excluding the re-coating of latex, was prepared under much the same condition.

The fabric thus obtained exhibited 0.023 g/ml of benzene adsorption. This result indicates that 13% drop in the adsorption was caused by the re-coating of latex, but the adsorptivity was proved to be acceptable regardless of re-application.

Example 4

A sheet form fabric laminate comprised of two ply construction (one ply: 3 mm thick) having wavy coarse three dimension, is used as a carrier of activated carbon particles to prepare deodoring article with dust collecting function, for an air-conditioner equipped in a car.

This laminate was dipped in the bath containing non-solvent binder (prepolymer composed of polyisocyanate and polyester) and squeezed by rubber rolls to adjust a binder picked-up amount and subjected to air blowing to remove films yielded in the internal structure of the porous laminate. Thereby the binder layer is formed on sheet surface as well as on internal structure. Then, the laminate was passed through a fluidizing bed in which the activated carbon particles are fluidizing to adhere such particles to sheet surface as well as internal structure, wherein the activated carbon particles (made form coconut shells, 28–70 mesh) was mixture: 90 wt % carries nothing and the rest 10% carries phosphoric acid 10 wt %).

Then, the fabric incorporated with the particles was passed through the press rollers to suffice adherence with the binder to the particles, and excess particles or weakly adhered particles were shaken off by vibrating the sheet.

The amount of retaining the activated carbon particles obtained in Example 4 was 0.14 g/ml, and adsorptive capacity for benzene (measured by JIS K 1474-1975) was 0.035 g/ml.

The fabric (200×200×5 mm) obtained in Example 4 was tested for deodoring purpose. Malodoring component: hydrogen sulfide 50 ppm, or ammonia 50 ppm, was contained in a box (1×1×1 meter) in which the fabric was suspended and air was circulated. In either case malodor was completely removed in about 30 min.

What is claimed is:

1. An adsorbent article which is capable of collecting dust, comprising:
   a woven sheet having a coarse three-dimensional structure and a ridge and recess configuration whose surface area and internal fiber structure comes into contact with air, said sheet having on its surface and in its internal structure a binder layer of a latex, emulsion or non-solvent adhesive, and containing partially exposed carbon particles on said surface and distributed throughout said internal structure.

2. The adsorbent article of claim 1, wherein said binder layer containing partially exposed carbon particles is coated with a layer of binder.

3. The adsorbent article of claim 1, wherein said coarse, woven sheet has a warp density of 10 to 50 per inch and a weft of 10 to 50 per inch.

4. The adsorbent article of claim 1, wherein said carbon particles have an internal surface area of several hundred square meters or more per gram of carbon particle.

5. The adsorbent article of claim 1, wherein said particles have a size range smaller than 20 mesh and larger than 100 mesh.

6. The adsorbent article of claim 1, wherein said latex or emulsion has a solids content of greater than 30%.

7. The adsorbent article of claim 6, wherein said solids content is greater than 50%.

8. The adsorbent article of claim 1, wherein said latex is an SBR, chloroprene or nitrile rubber latex.

9. The adsorbent article of claim 1, wherein said emulsion is that of an acrylic acid ester-acrylic acid copolymer, an ethylene-vinyl acetate copolymer or a polyvinyl acetate suspended in water.

10. The adsorbent article of claim 1, wherein said activated carbon particles contain aniline, phosphoric acid, maleic acid or ferric or ferrous salts.

11. A method of filtering air in an air-conditioner, comprising:
    passing the air through an air-filtering component of the air-conditioner which is the adsorbent article of claim 1.

12. A method of filtering air in an air-cleaner for automobiles, comprising:
    passing air through an air filtering component formed of the adsorbent article of claim 1.

13. A process for preparing an adsorbent article of a woven sheet having a coarse three-dimensional structure with a dust collecting function, which is prepared by:
    dipping a woven sheet into a bath containing a latex, an emulsion or a non-solvent adhesive, thereby infiltrating and impregnating the woven structure with a binder material;
    squeezing the binder impregnated sheet through rollers and blowing air therethrough in order to break or remove films of binder between the intertwined internal fibers of the sheet;
    passing the binder impregnated woven sheet laterally through a fluidized bed of activated carbon particles kept in the fluidized state by an upward flow of air slightly over the minimum necessary to maintain the fluidized state, wherein the force of upwardly flowing air forces the carbon particles uniformly into the internal structure of the woven sheet; and then
    pressing the sheet containing the carbon particles between rollers thereby firmly adhering the particles within the sheet and leaving individual particles partially exposed in the internal fiber structure of the sheet.

14. The process of claims 13, further comprising re-coating surface of the activated carbon particle, containing woven sheet with a binder.

15. An adsorbent article of a woven sheet having a coarse three-dimensional structure with a dust collecting function, which is prepared by a process comprising:
    dipping a woven sheet into a bath containing a latex, an emulsion or a non-solvent adhesive, thereby infiltrating and impregnating the woven structure with a binder material;
    squeezing the binder impregnated sheet through rollers and blowing air therethrough in order to break or remove films of binder between the intertwined internal fibers of the sheet;
    passing the binder impregnated woven sheet laterally through a fluidized bed of activated carbon particles kept in the fluidized state by an upward flow of air slightly over the minimum necessary to maintain the fluidized state, wherein the force of upwardly flowing air forces the carbon particles uniformly into the internal structure of the woven sheet; and then
    pressing the sheet containing the carbon particles between rollers thereby firmly adhering the particles within the sheet and leaving individual particles partially exposed in the internal fiber structure of the sheet.

16. The adsorbent article of claim 15, wherein the surface of the sheet article is re-coated with a binder.

17. The adsorbent article of claim 15, wherein the woven sheet has a sectional ridge and recess configuration.

18. The adsorbent article of claim 15, wherein the activated carbon particles partially carry aniline, phosphoric acid, maleic acid, ferrous salt or ferric salt.

* * * * *

UNITED STATES PATENT AND TRADEMARK OFFICE
CERTIFICATE OF CORRECTION

PATENT NO. : 6,207,255 B1
DATED : March 27, 2001
INVENTOR(S) : Fukuura et al.

It is certified that error appears in the above-identified patent and that said Letters Patent is hereby corrected as shown below:

<u>Title page, column 1,</u>
Item [54], column 1, the title should read:

[54] ADSORBENT ARTICLE WITH DUST COLLECTING FUNCTION

Item [30], the Foreign Priority information should read:

[30] Foreign Application Priority Data

Apr. 12, 1996 (JP) ......................... 8-115551

Signed and Sealed this

Thirtieth Day of October, 2001

*Attest:*

NICHOLAS P. GODICI
*Attesting Officer*  Acting Director of the United States Patent and Trademark Office